United States Patent Office
3,192,392
Patented June 29, 1965

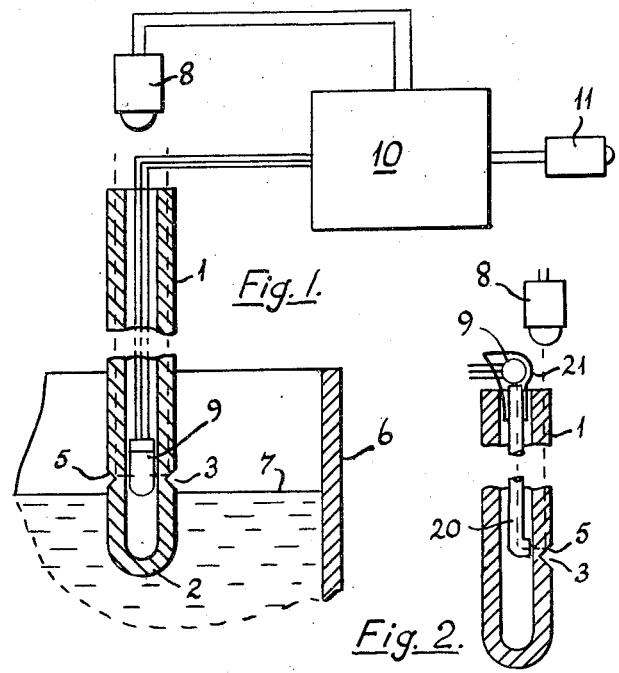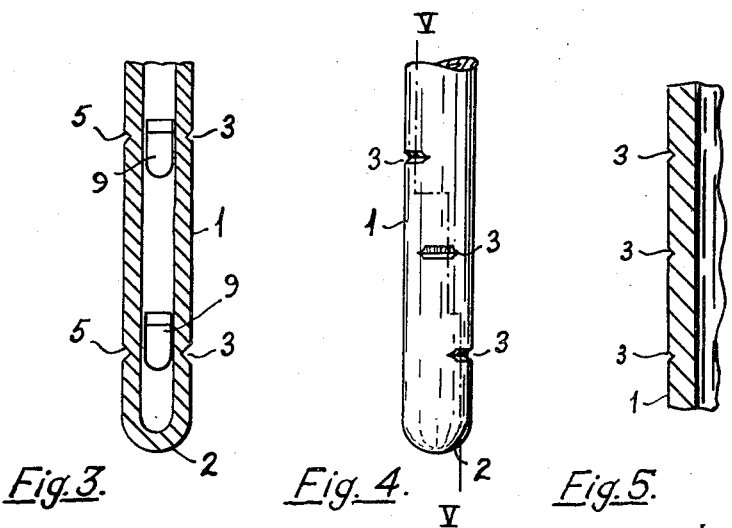

3,192,392
PHOTOELECTRIC APPARATUS TO DETECT
LIQUID LEVEL
William C. Reed, Whitley Bay, Northumberland, England, assignor to The Thermal Syndicate Limited, Wallsend, Northumberland, England, a British company
Filed Mar. 5, 1963, Ser. No. 262,907
Claims priority, application Great Britain, Mar. 29, 1962, 12,056/62
10 Claims. (Cl. 250—227)

This invention relates to a method of detecting when the free surface of liquid within a container lies in a particular plane and also relates to an improved liquid-level detecting-device.

According to one feature of the invention, a method of detecting when the boundary surface between a liquid and a gaseous medium within a container lies in a particular plane, comprises passing a beam of visual, or near visual, radiation along a piece of material which is transparent to the radiation, is disposed within the container and has a groove indenting the liquid-contacting surface of the material to form a reflecting surface thereon which is intersected by the plane, and detecting a difference in the intensities of radiation reflected from the reflecting surface depending on whether the latter is a material/gaseous medium interface or a material/liquid interface.

Preferably the reflecting surface is inclined at substantially 45° to the plane. Conveniently the piece of material is a rod or tube of circular cross-section the reflecting surface being formed by a circumferential groove therein. Advantages accrue from using vitreous silica as the transparent material, since because of the high softening point and low chemical activity of vitreous silica, a liquid-level detecting-device made from vitreous silica can be used for a wide range of different liquids and over a wide range of operating temperatures.

According to a further feature of the invention a liquid-level detecting-device comprises a transparent tube of circular cross-section closed at one end and having a circumferential groove formed in the outer surface of the tube, said groove providing a frusto-conical reflecting surface converging in the direction towards the closed end. A photoelectric device would normally be used to detect changes in the intensity of radiation reflected from the reflecting surface. The device may be located within the tube or may receive the reflected radiation via a beam transmitting rod disposed within the tube. In place of a transparent tube a transparent rod or bar may be employed. The photoelectric device may be a photo-transistor.

Embodiments of the invention will now be described by way of example, with reference to the accompanying drawing, in which:

FIGURE 1 is a schematic representation of a first embodiment of the liquid level detecting device of the present invention with its associated electro-optical equipment;

FIGURE 2 is schematic representation of a second embodiment of the liquid level detecting device of the present invention shown with photoelectric device and lamp;

FIGURE 3 is a schematic representation of a third embodiment of the liquid level detecting device of the present invention shown without illuminating means;

FIGURE 4 is a schematic representation of a fourth embodiment of the liquid level detecting device of the present invention shown without illuminating means; and FIGURE 5 is a view taken along the line V—V of FIGURE 4.

Referring to FIGURE 1, the liquid-level detecting-device comprises a transparent vitreous silica tube 1 closed at its end 2. Tube 1 has a circumferential groove 3 ground into the outer surface thereof, the median plane of the groove 3 being normal to the longitudinal axis of the tube 1. Groove 3 exhibits a frusto-conical reflecting surface 5 of semi-angle 45° which converges towards the end 2. The tube 1 is shown positioned vertically within a container 6 containing a liquid 7, the median plane of the groove 3 being disposed in the particular horizontal plane which it is desired the liquid should reach when its level is detected. To use the device a suitable lamp 8 is disposed above the tube 1 so that the upper end of the tube 1 is illuminated, the lamp being positioned so that light is transmitted down the wall of the tube (i.e., as shown by the dotted lines in FIGURE 1). A photo-transistor 9 is suspended within the tube 1 so that the photo-sensitive area of the transistor is positioned to receive light reflected from the surface 5.

When the liquid level is below the level of the groove 3 the surface 5 is a vitreous silica/air interface and the light passing down the wall of the tube 1 is totally reflected from the surface 5 to impinge upon the transistor 9. When the liquid level rises sufficiently the groove 3 becomes filled with liquid so that the surface 5 becomes a vitreous silica/liquid interface and the light is largely refracted through the surface 5 instead of being wholly reflected by it, the sensitive area of the transistor 9 being no longer illuminated to any appreciable extent. FIGURE 1 shows the transistor (schematically) connected to a detecting circuit 10 which is designed so that a signal lamp 11 is switched on if the transistor 9 is illuminated and is switched off when the transistor 9 is substantially unilluminated.

A practical device as illustrated in FIGURE 1 permits variations in free surface level of less than 0.002" to be detected.

In a modified form of the device illustrated in FIGURE 3, two grooves are formed in the tube and a separate photo-transistor is located within the tube in the median plane of each groove. Each photo-transistor has its own detecting circuitry similar to that employed with the device of FIGURE 1, so that the level of liquid can be detected as it reaches each groove. This modification can therefore be used to control the liquid in a container between a high level and a low level, by replacing the signal lamp of each of the detector circuits 10 by a relay or other known control device. Modifications of this device need not be limited to two grooves, and the embodiment of FIGURE 4 shows three grooves. Clearly as many grooves as are required could be inscribed in a vitreous silica tube and by known circuitry, actual level measurement could be obtained.

The device described with reference to FIGURE 1 is suitable for use with all liquids up to a temperature governed by the maximum operating temperature of the photo-transistor used. In the case of the device illustrated, in which a germanium photo-transistor is employed, this limiting temperature is 65° C. This temperature may be increased by using other photo-transistors or other photoelectric devices that have a higher maximum operating temperature. Where it is required to detect the level of a liquid which is at a higher temperature than the maximum operating temperature of any practical photoelectric device, cooling of the device can be effected by causing a fluid cooling medium to flow down the tube.

FIGURE 2 illustrates a further embodiment of device in which the photo-transistor 9 has been removed from the bore of the tube 1 and replaced by a transparent vitreous silica beam transmitting rod 20, whose end is ground to 45° or, as in the device illustrated, is bent through 90°. The rod 20 extends from the groove 3

(which in this embodiment extends around only part of the circumference of the tube) to beyond the free end of the tube 1 and the photo-transistor 9 is mounted at the free end of the rod 20. Light from the surface 5 is reflected into the rod 20 and is transmitted to the photo-transistor 9 which is connected to a suitable detector circuit as before. A suitable cover 21 surrounds the transistor 9 to shield it from direct radiation from the lamp 8.

Clearly many modifications of the embodiments described may be made without departing from the invention as hereinafter defined. Although only vitreous silica has been referred to as the transparent material, clearly other transparent materials could be used depending on the temperature and chemical nature of the liquid whose level is to be determined.

What is claimed is:

1. A liquid level detecting device, comprising an elongated transparent tube of uniform cross-section having a wall, an outer surface and an axis, said tube being closed at one end and having a groove formed in said tube spaced from the closed end of said tube and indenting the outer surface of the said tube, said groove having a median plane normal to the axis of said tube and a reflecting surface converging toward the axis of said tube in a direction toward the closed end thereof; illuminating means located at the end of the tube remote from the closed end thereof and positioned to direct a beam of light along the wall of said tube to impinge on the reflecting surface of said groove; and detection means located at least in part within said tube and positioned to receive light reflected from said reflecting surface of said groove.

2. A liquid level detecting device as claimed in claim 1, wherein the reflecting surface of said groove is inclined at an angle of 45 degrees with the axis of said tube.

3. A liquid level detecting device as claimed in claim 1, wherein said detection means comprises photoelectric means positioned within said tube to receive directly light reflected from the reflecting surface of said groove.

4. A liquid level detecting device as claimed in claim 1, wherein said detection means comprises photoelectric means positioned at the end of the tube remote from the closed end thereof and beam transmitting means positioned within said tube to receive light reflected from the reflecting surface of said groove and to transmit said reflected light to said photoelectric means.

5. A liquid level detecting device as claimed in claim 4, wherein said beam transmitting means comprises a light transmitting rod.

6. A liquid detecting device, comprising an elongated transparent tube of uniform cross-section having a wall, an outer surface and an axis, said tube being closed at one end and having a plurality of grooves formed in said tube spaced from each other and from the closed end of said tube and indenting the outer surface of the said tube, each of said grooves having a median plane normal to the axis of said tube and a reflecting surface converging toward the axis of said tube in a direction toward the closed end thereof; illuminating means located at the end of the tube remote from the closed end thereof and positioned to direct light along the wall of said tube to impinge on the reflecting surface of each of said grooves; and detection means located at least in part within said tube and positioned to receive light reflected from the reflecting surface of each of said grooves.

7. A liquid level detecting device as claimed in claim 6, wherein the cross-section of said tube is annular.

8. A liquid level detection device as claimed in claim 6, wherein the reflecting surface of each of said grooves is inclined at an angle of 45 degrees with the axis of said tube.

9. A liquid level detecting device as claimed in claim 6, wherein said detection means comprises a plurality of photoelectric means positioned within said tube to each receive directly light reflected from the reflecting surface of a corresponding one of said grooves.

10. A liquid level detecting device as claimed in claim 6, wherein said detection means comprises a plurality of photoelectric means positioned at the end of the tube remote from the closed end thereof and beam transmitting means positioned within said tube to receive light reflected from the reflecting surface of each of said grooves and to transmit said reflected light to corresponding ones of said photoelectric means.

References Cited by the Examiner

UNITED STATES PATENTS

| 1,883,971 | 10/32 | Kryzanowsky | 88—1 |
| 2,190,027 | 2/40 | Jordon | 88—1 |
| 2,350,712 | 6/44 | Barsties | 250—218 X |
| 3,065,354 | 11/62 | Bird | 250—18 |
| 3,118,069 | 1/64 | Guillant | 250—231 |
| 3,120,125 | 2/64 | Vasel | 88—14 |

FOREIGN PATENTS

| 1,266,565 | 6/61 | France. |
| 906,609 | 9/62 | Great Britain. |

RALPH G. NILSON, *Primary Examiner.*